United States Patent
Sureka

(10) Patent No.: US 10,454,844 B2
(45) Date of Patent: Oct. 22, 2019

(54) DYNAMIC CAPACITY PLANNING FOR APPLICATION DELIVERY PLATFORM ACROSS MULTIPLE CLOUD DEPLOYMENT

(71) Applicant: A10 Networks, Inc., San Jose, CA (US)

(72) Inventor: Saurabh Sureka, Campbell, CA (US)

(73) Assignee: A10 Networks, Inc., San Jose, CA (US)

( * ) Notice: Subject to any disclaimer, the term of this patent is extended or adjusted under 35 U.S.C. 154(b) by 86 days.

(21) Appl. No.: 15/453,757

(22) Filed: Mar. 8, 2017

(65) Prior Publication Data

US 2018/0262413 A1 Sep. 13, 2018

(51) Int. Cl.
| | |
|---|---|
| H04L 12/26 | (2006.01) |
| H04L 12/923 | (2013.01) |
| H04L 12/24 | (2006.01) |
| H04L 12/911 | (2013.01) |

(52) U.S. Cl.
CPC ........ H04L 47/762 (2013.01); H04L 41/0896 (2013.01); H04L 43/0876 (2013.01); H04L 43/16 (2013.01); H04L 47/748 (2013.01)

(58) Field of Classification Search
CPC .................................................. H04L 12/4641
See application file for complete search history.

(56) References Cited

U.S. PATENT DOCUMENTS

| | | | | |
|---|---|---|---|---|
| 8,813,072 | B1 * | 8/2014 | Signaoff | G06F 9/45541 718/1 |
| 9,811,281 | B2 * | 11/2017 | Bivens | G06F 3/0619 |
| 2008/0244600 | A1 * | 10/2008 | Wong | G06F 9/5083 718/104 |
| 2010/0220622 | A1 * | 9/2010 | Wei | H04L 41/0896 370/252 |
| 2014/0304703 | A1 * | 10/2014 | Larson | G06F 9/4416 718/1 |
| 2014/0344457 | A1 * | 11/2014 | Bruno, Jr. | A63F 13/12 709/226 |
| 2015/0301759 | A1 * | 10/2015 | Gu | H04L 67/1097 711/114 |
| 2016/0034359 | A1 * | 2/2016 | Cabrera | G06F 11/1464 714/19 |
| 2016/0043968 | A1 * | 2/2016 | Jacob | H04L 47/808 709/226 |
| 2016/0191631 | A1 * | 6/2016 | Haraszti | H04L 67/14 709/227 |
| 2017/0111289 | A1 * | 4/2017 | Cropper | H04L 12/1428 |

(Continued)

*Primary Examiner* — Edan Orgad
*Assistant Examiner* — Emmanuel K Maglo
(74) *Attorney, Agent, or Firm* — Keith Kline; The Kline Law Firm PC

(57) ABSTRACT

A method for dynamic allocating of a resource capacity in a cloud computing deployment is disclosed. According to the method, a resource capacity allocation of a network instance is determined and a resource capacity demand of the network instance is monitored. If the resource capacity demand exceeds a first threshold value, the resource capacity allocation of the network instance is increased by allocating additional resource capacity of a shared pool of network instances. However, if the resource capacity demand falls below a second threshold value, the resource capacity allocation of the network instance is decreased by deallocating the additional resource capacity back to the shared pool of network instances.

51 Claims, 4 Drawing Sheets

(56) References Cited

U.S. PATENT DOCUMENTS

| | | | |
|---|---|---|---|
| 2017/0149931 A1* | 5/2017 | Lochhead | H04L 67/327 |
| 2017/0199910 A1* | 7/2017 | Konik | G06F 17/30463 |
| 2017/0220392 A1* | 8/2017 | Cropper | G06F 9/5083 |
| 2017/0295108 A1* | 10/2017 | Mahindru | H04L 47/70 |
| 2017/0351441 A1* | 12/2017 | Marinescu | G06F 3/0619 |
| 2017/0357532 A1* | 12/2017 | Miraftabzadeh | H04L 67/1008 |
| 2018/0034909 A1* | 2/2018 | Nachimuthu | H04L 41/0813 |
| 2018/0145923 A1* | 5/2018 | Chen | H04L 47/70 |
| 2018/0157532 A1* | 6/2018 | Kumar | G06F 9/4881 |
| 2018/0165469 A1* | 6/2018 | KS | G06F 21/6227 |

\* cited by examiner

DYNAMIC CAPACITY PLANNING FOR APPLICATION DELIVERY PLATFORM ACROSS MULTIPLE CLOUD DEPLOYMENT

TECHNICAL FIELD

This disclosure relates generally to resource capacity allocation. More specifically, this disclosure relates to dynamic allocating of resource capacity among network instances in a cloud computing environment using a shared pool of network resources.

BACKGROUND

Cloud computing is widely used to provide different types of functionality including data storage and management, web services, web applications, web hosting, and so forth. A typical cloud computing environment, or simply "a cloud," is an abstraction of multiple data networks, network appliances, and/or multiple computational resources which collectively appear to an end user as a single space of seamless resources.

Cloud computing environments can employ network instances, such as servers, bare machines, hypervisors, data routers, or other network hardware. The network instances can also include application network appliances or network software applications. One problem with the deployment of network instances is a static capacity of a network instance, such as 5 or 10 Gigabits per second. When a demand in receiving or sending data traffic exceeds the capacity of a given network instance, the overall performance degrades and the operation slows down until the network instance is replaced with another network instance of larger capacity. Accordingly, the existing technologies may not adequately enable updating network instances or other network resources to accommodate fluctuating demand in data traffic.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter. The following concepts and aspects of the disclose are designed to solve at least some drawbacks known in the art.

In one aspect of this disclosure, there is provided a method for dynamic allocating of a resource capacity in a cloud computing deployment. According to the method, a resource capacity allocation of a network instance is determined, and a resource capacity demand of the network instance is monitored. If the resource capacity demand exceeds a first threshold value, the method increases the resource capacity allocation of the network instance by allocating additional resource capacity of a shared pool of network instances. However, if the resource capacity demand falls below a second threshold value, the method decreases the resource capacity allocation of the network instance by deallocating the additional resource capacity back to the shared pool of network instances.

In another aspect of this disclosure, there is provided a system to implement the above method for dynamic allocating of the resource capacity in the cloud computing deployment. In yet another aspect of this disclosure, there is provided a non-transitory processor-readable medium having instructions stored thereon, which when executed by one or more processors, cause the one or more processors to implement the above method for dynamic allocating the resource capacity in the cloud computing deployment.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
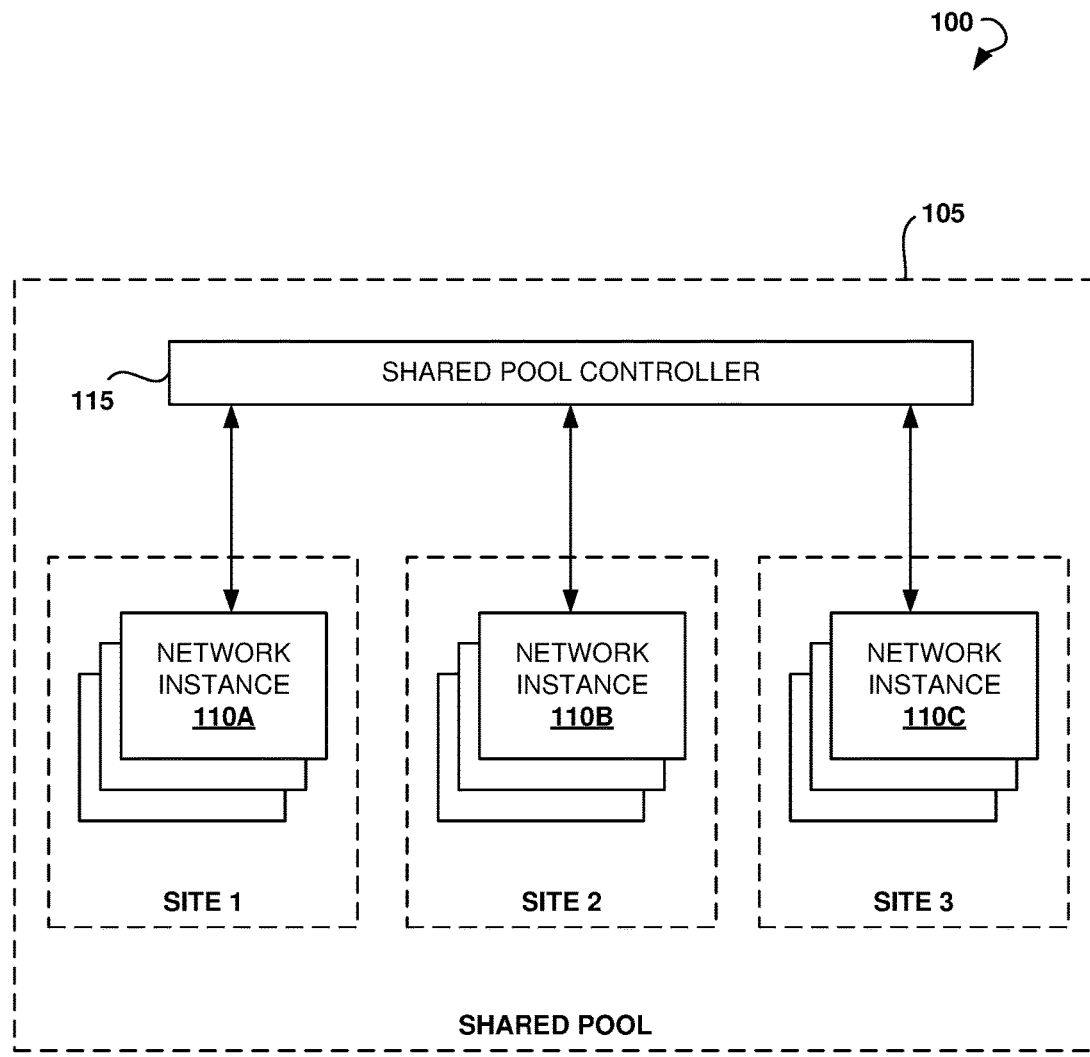
FIG. 1 shows an example system architecture for dynamic allocating of a resource capacity in a cloud computing deployment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

For purposes of this patent document, the terms "or" and "and" mean "and/or" unless stated otherwise or clearly intended otherwise by the context of their use. The term "a" means "one or more" unless stated otherwise or where the use of "one or more" is clearly inappropriate. The terms "comprise," "comprising," "include," and "including" are interchangeable and not intended to be limiting. For example, the term "including" can be interpreted to mean "including, but not limited to."

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a non-transitory storage medium, such as a disk drive or computer-readable medium. It should be noted that methods disclosed herein can be implemented by a computer (e.g., a server, desktop computer, tablet computer, laptop computer), network node, network device, network instance, network controller, and the like.

The present disclosure concerns a technology for dynamic resource capacity planning and allocating within a cloud computing environment such as a single-cloud, multi-cloud, hybrid-cloud, or multi-device deployment. The technology addresses the technological problem of provisioning network instances with a static, preconfigured bandwidth capacity, which is either underutilized or less than required for a given application.

In the disclosed technology, the resource capacity of network instance is intelligently and dynamically adjusted based at least on data traffic metrics. The dynamic adjustments are possible due to additional resource capacity available from a shared pool of multiple network instances. A mechanism for capacity sharing, according to this disclosure, enables efficiently scaling up and down the bandwidth of a given network instance in the cloud deployment and also provides better resource utilization. In some implementations, the shared pool of network instances can encompass more than one site. For example, when one network instance from one site needs to enlarge its resource capacity, it can procure additional resource capacity from the shared pool (i.e., from network instances located at other sites, but which are associated with the same shared pool). The network instance can also procure an additional license from the shared pool to use available resource capacities of the shared pool.

The mechanism to scale up and down the resource capacity of a given network instance can enlarge it by two, three, or more times, or decrease by the same values, depending on the particular application and demand. This technology also provides a new business opportunity for various enterprises, companies, and organizations to buy and share resource capacities with the shared pool for profit. For example, when a customer (e.g., a small company) needs to enlarge its cloud storage, the customer can quickly get a license to use certain resource capacities of the shared pool, rather than purchasing and deploying new network equipment.

In certain embodiments, the shared pool can be associated with, linked to, or include a shared pool controller designed to monitor and manage shared resource planning and allocation. For example, the shared pool controller can assign an additional resource capacity to a certain network instance of one of the sites when a need for additional bandwidth is determined. Similarly, the shared pool controller can acquire back (deallocate, remove, or decrease) the previously assigned additional resource capacity when the network instance no longer needs it. The need for additional resource capacities can be identified based on data traffic, data size, data storage needs, or other metrics, which can be measured by the network instances, the shared pool controller, or both. In other words, the dynamic allocation of resource capacity can be as follows. For a given network instance, a resource capacity allocation can be determined by the network instance or the shared pool controller. Further, a resource capacity demand is repeatedly determined, monitored, detected, or calculated by the network instance or the shared pool controller. If the resource capacity demand exceeds a first threshold value, the resource capacity allocation of the network instance is increased by allocating additional resource capacity of the shared pool. Alternatively, if the resource capacity demand falls below a second threshold value, the resource capacity allocation of the network instance can be decreased by deallocating (i.e., returning) the additional resource capacity back to the shared pool of network instances. The first and second threshold values can optionally be predetermined or predefined. For example, the first and second threshold values can be dynamically determined based on various data metrics such as data traffic changes, data traffic demand, a rate of change in data traffic demand, data traffic demand predictions, demand estimations, and the like. The first and second threshold values can be dynamically determined by the shared pool controller or network instances.

The need for resource capacity can be also determined at any stage of deployment and use of network instances. First, the resource capacity can be allocated from the shared pool during pre-boot, initialization, installation, power-on, or reboot time. Second, the resource capacity can be repeatedly adjusted (i.e., scaled up or down) during regular operation time.

The shared pool can be created during pre-boot time, but it can be adjusted by associating and de-associating network instances at any time later on. Each network instance can use, include, or store a token or other identifier that can be used to indicate association of the network instance to the shared pool. The tokens or identifiers can be stored by both the network instances and the shared pool controller.

In yet additional embodiments, there can be provided more than one shared pool of network instances. The shared pools can be either independent from one another or operatively linked to one another. The shared pools can be monitored and controlled by yet another controller or one of shared pool controllers of one of the shared pools.

In this disclosure, the term "resource capacity" (or simply "capacity") shall be construed to mean the ability of a network, a plurality of networks, a portion of a network, or network instance (whether individually or in concert with one another) to provide a requested or needed service, act, or level of performance. One metric of resource capacity is "bandwidth," which can be understood as a size of channel capable of carrying out, processing, or transmitting digital data. In certain implementations, the terms "capacity" and "bandwidth" can be interchangeably used, but not necessarily.

In this disclosure, the term "network instance" shall be construed to mean a physical or virtual network entity such as a hardware network appliance, software network appliance, virtual network appliance, application network appliance, physical or virtual network provider, physical or virtual network operator, network equipment, network node, server, bare machine, virtual machine, thin client, hypervisor, data router, network router, modem, and the like.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for dynamic allocating of a resource capacity in a cloud computing deployment, according to one example embodiment. System architecture 100 includes a shared pool 105 consisting of a plurality of network instances 110. Shared pool 105 can refer to a multi-cloud, single-cloud, hybrid-cloud, or multi-device deployment or network environment. Shared pool 105 can be associated with one or more sites. The term "site" shall be construed to mean a geographic location or multiple geographic locations, such as an area or zone, where one or more network instances, which are appropriately linked together, can be provisioned or deployed. The term "site" also covers a network (web) site, an online (web) platform, an organization, a firm, a company, an organization, an enterprise, and the like. For example, as shown in FIG. 1, shared pool 105 is associated with or includes three sites: Site 1, Site 2, and Site 3. It should be appreciated that any number of sites can be linked to shared pool 105, including one, two, three, four, five, or more. The sites are not overlapping in the embodiment shown, but this is not always the case. Each site includes one or more network instances 110. In the shown example, Site 1 includes one or more network instances 110A, Site 2 includes one or more network instances 110B, and, similarly, Site 3 includes one or more network instances 110C. Each of Site 1, Site 2, and Site 3 can have the same or substantially same resource capacity of network instances 110. It should be also mentioned that there can be one or more network instances 110 which do not belong to any site, but which are still within shared pool 105. Furthermore, in certain embodiments, there can be one or more network instances 110 which do not belong to any site nor shared pool 105; i.e., these network instances 110 are outside of shared pool 105. Regardless of implementation, any network instance 110, inside or outside of shared pool 105, can implement at least some operations of the disclosed method for dynamic allocating of a resource capacity in a cloud computing deployment.

Shared pool 105 can include or be operatively connected to a shared pool controller 115. Shared pool controller 115 can include a processor, computer, server, network instance 110, and the like. Shared pool controller 115 is configured to implement at least some operations of the disclosed method for dynamic allocating of the resource capacity in the cloud computing deployment.

Shared pool controller 115 can be operatively connected to network instances 110A-110C via one or more data networks. Moreover one or more network instances 110A-110C can be connected with one another via at least one of the data networks. According to embodiments of this disclosure, each data network cam refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network includes a corporate network, data center network, service provider network, mobile operator network, or any combinations thereof.

Each of network instances 110A-110C can be associated with shared pool 105 and shared pool controller 115 by storing a token or any identifier. Similarly, shared pool controller 115 can store the tokens or identifiers of all network instances 110A-110C such that association of network instances 110A-110C with shared pool 105 is evident for those devices that request it.

Each of network instances 110A-110C can be initially assigned with a certain resource capacity. For example, during pre-boot, power-on, initialization, or reboot period, network instances 110A-110C request initial resource capacity from shared pool controller 115, and, in response thereto, shared pool controller 115 allocates or assigns certain resource capacity to requesting network instances 110A-110C. Alternatively, shared pool controller 115 allocates the initial resource capacity to all or some of network instances 110A-110C without receiving any requests from network instances 110A-110C. The initial allocation of resource capacity may not depend on traffic demand, but rather be predefined, but this is not always the case. In other implementations, at initial steps of operation, network instances 110A-110C can measure, assess, detect, calculate, predict, or otherwise determine traffic metrics or demands, and request resource capacity allocation based thereupon. Further, during normal operation, network instances 110A-110C repeatedly determine data traffic demand or another metric and request to scale up or down the allocated resource capacity according to the methods described herein. In certain embodiments, the data traffic demand or other data metric can be measured or determined by shared pool controller 115 in addition to or instead of network instances 110A-110C.

Figure 2:
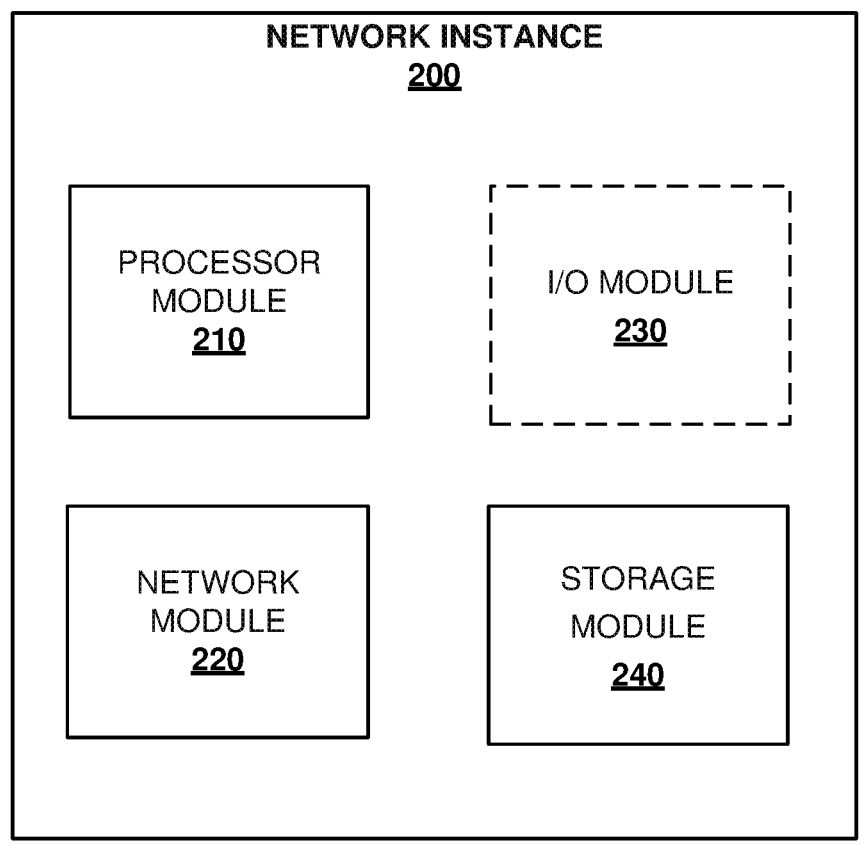
FIG. 2 illustrates an example embodiment of a network instance.

FIG. 2 illustrates an example embodiment of a network node 200 which can be an instance of an implementation of network instance 110 or shared pool controller 115. In some embodiments, network node 200 can also include a network appliance or a computing device suitable for performing at least some methods steps described herein. As shown in FIG. 2, network node 200 includes a processor module 210, a network module 220, an optional input/output (I/O) module 230, and a storage module 240. These elements may be interconnected via a local microprocessor bus, one or more I/O buses, printed circuit board, or any other electrical, optical, or electromagnetic interface, of any combinations thereof.

Processor module 210 may include one or more processors such as microprocessors, microcontrollers, processors, central-computing units (CPUs), and so forth. In addition, processor module 210 can include one or more processor cores embedded in a single processor. In some embodiments, processor module 210 includes one or more embedded processors, or embedded processing elements in the form of a Field Programmable Gate Array (FPGA), an Application Specific Integrated Circuits (ASICs), or Digital Signal Processors (DSPs). Processor module 210 can be configured to provide data processing, such as, for example, implementing computer-readable or processor-readable instructions stored in storage module 240 or received with network module 220 to perform one or more method steps as described herein.

Network module 220 can be utilized to communicate with external devices, external computing devices, server devices, client devices, security gateways, network instances, and any other networked computing devices via one or more data networks such as one or more wired, wireless, or optical networks including, for example, the Internet, intranet, LAN, WAN, T1/T3 interface, cellular phone networks, Bluetooth radio, Ethernet, IEEE 802.11-based interface, among others. Network module 220 may also include a network interface card, such as an Ethernet card, optical transceiver, radio frequency transceiver, or any other type of device that can send and receive information. In some embodiments, network module 220 includes a network processor for processing data involved in data communication.

Optional I/O module 230 provides a portion of a user interface. Input devices of the I/O module 230 may include an alphanumeric keypad, such as a keyboard, for inputting alphanumeric and other information, or a pointing device, such as a mouse, trackball, stylus, cursor direction keys, motion detector, camera, microphone, and so forth. Output devices of the I/O module 230 can include suitable output devices including displays, touchscreens, projectors, speakers, printers, haptic devices, and so forth.

Non-transitory storage module 240 provides data storage functions. Storage module 240 may be implemented as a non-volatile computer-readable (processor-readable) medium such as, for example, a magnetic disk drive, magnetic memory device, optical disk drive, optical memory device, solid-state disk drive, solid-state memory device, Read-Only Memory (ROM), Random-Access Memory (RAM), Static Random-Access Memory (SRAM), Dynamic Random-Access Memory (DRAM), Programmable Read-Only Memory (PROM), Erasable Programmable Read-Only Memory (EPROM), or any other optical medium, any other physical medium, any other memory chip or cartridge, a carrier wave, or any other medium that can be read or used for write by a computer or processor. Storage module 240 can store system software, middleware, firmware, software applications, downloadable applications, operating systems, or data for implementing at least some of method steps described herein.

Figure 3:
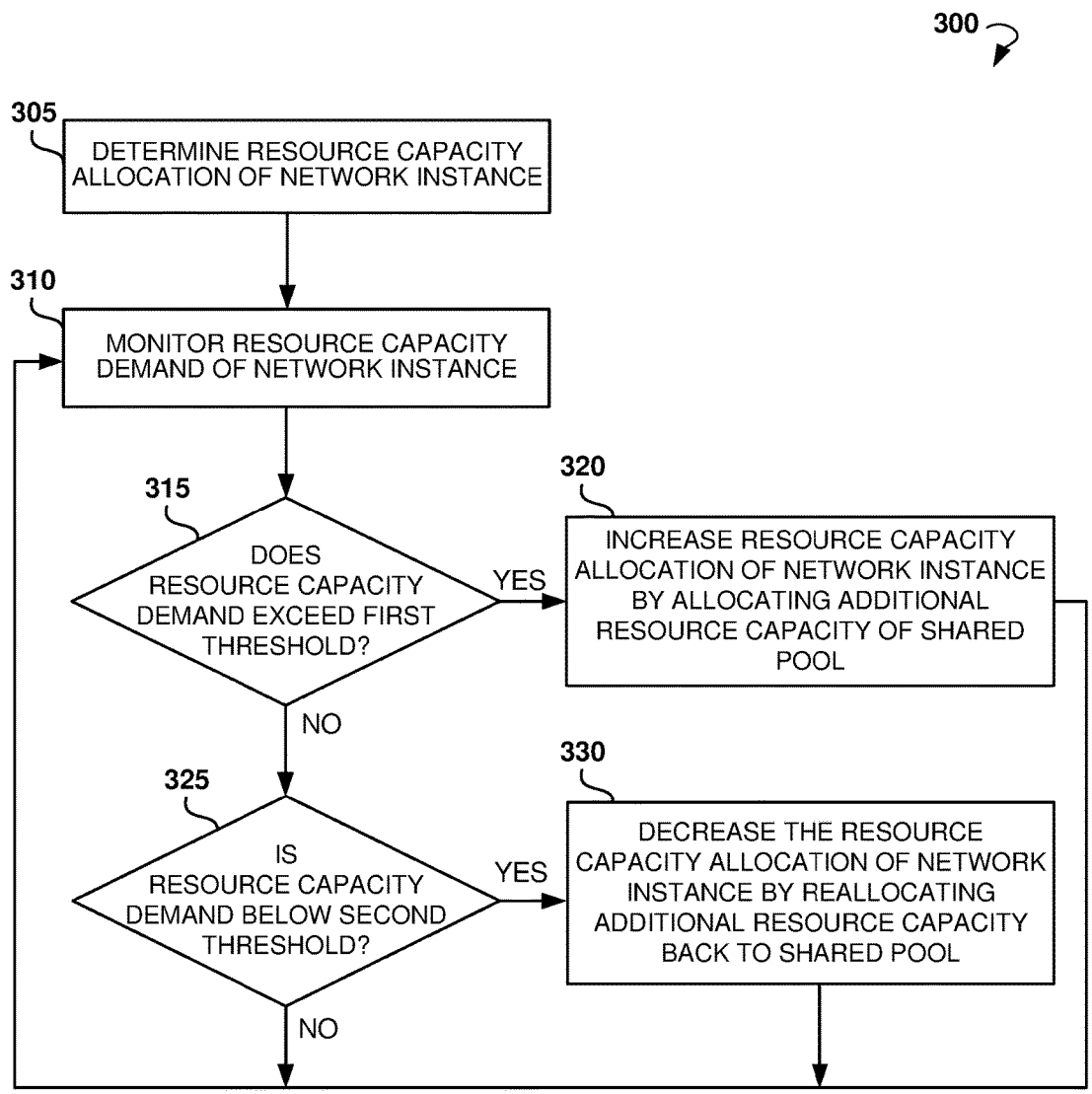
FIG. 3 illustrates a block diagram of an example method for for dynamic allocating of a resource capacity in a cloud computing deployment.

FIG. 3 illustrates a block diagram of a method 300 for dynamic allocating a resource capacity in a cloud computing deployment, according to one example embodiment. Method 300 may be performed by processing logic that may comprise hardware (e.g., decision-making logic, dedicated logic, programmable logic), software (such as software run on a general-purpose computer system or a dedicated machine), or a combination of both. In one example embodiment, method 300 is implemented by the devices of system architecture 100 such as by the shared pool controller 115 and/or network instances 110. Operations of method 300 may be implemented in an order different than described and shown in FIG. 3. Moreover, method 300 may have additional steps not shown herein, but which can be evident for those skilled in the art from the present disclosure. Finally, method 300 may also have fewer steps than outlined below and shown in FIG. 3.

Method 300 can commence with certain initial operations, which are not shown in FIG. 3. For example, method 300 may commence with creating shared pool 105 of network instances 110. Shared pool 105 can be created by associating or operatively linking two or more network instances 110 together. For these ends, a plurality of tokens (identifiers) are generated and saved at network instances 110 of shared pool 105 and also at shared pool controller 115. In addition, during a pre-boot, power-up, or reboot operation of each of network instances 110, initial resource capacity allocation can be performed. For example, shared pool controller 115 may receive an allocation request from the network instance 110, which was generated during its pre-boot, power-up, or re-boot operation. In response to the request, shared pool controller 115 provides initial resource capacity allocation for network instance 110 by allocating initial resource capacity of shared pool 105. The amount of initial resource capacity allocated to network instance 110 can be predetermined or determined based on the request or other criteria. Once some or all of these initial steps are performed, method 300 may proceed with the following operations.

At operation 305, network instance 110 (or shared pool controller 115) determines a resource capacity allocation of network instance 110. This can be determined based on initial resource capacity allocation or by shared pool controller 115 polling network instance 110. Here, network instance 110 can belong to one of sites shown in FIG. 1, but not necessarily. Moreover, in some implementations, network instance 110 can be outside of shared pool 105.

At operation 310, network instance 110 (or shared pool controller 115) monitors a resource capacity demand of network instance 110. The resource capacity demand of network instance 110 is monitored by measuring an incoming data traffic to the network instance. In addition, the resource capacity demand of network instance 110 can be monitored by measuring one or more data traffic metrics, such as a data pace, data load, data processing rate, quality of service, count of errors, and the like, or by providing estimations or predictions of data traffic metrics.

At operation 315, network instance 110 (or shared pool controller 115) determines if the resource capacity demand exceeds a first threshold value. If it is determined that the resource capacity demand exceeds the first threshold value, the method proceeds to operation 320 where shared pool controller 115 increases the resource capacity allocation of network instance 110 by allocating additional resource capacity of shared pool 105. The allocation can include assigning certain bandwidth or resource capacities of other network instances 110 belonging to shared pool 105. After operation 320 is completed, method 300 loops back to perform operation 310.

If it is determined that the resource capacity demand did not exceed the first threshold value, the method proceeds from operation 315 to operation 325 where network instance 110 (or shared pool controller 115) determines if the resource capacity demand falls below a second threshold value. If it is determined that the resource capacity demand falls below the second threshold value, the method proceeds to operation 330 where shared pool controller 115 decreases the resource capacity allocation of network instance 110 by deallocating the additional resource capacity back to shared pool 105. At the same operation 330, method 300 may also proceed with allocating at least a part of resource capacity of network instance 110 to another network instance 110 based on a command of shared pool controller 115.

After operation 330 is completed, method 300 loops back to perform operation 310. If it is determined that the resource capacity demand did not fall below the second threshold value, the method proceeds back to operation 310. Method 300 can be stopped by acquiring a predetermined command produced by network instance 110 or shared pool controller 115.

In one embodiment, the first threshold value or second threshold value are predefined or fixed values. In another embodiment, the first threshold value or second threshold value are non-predefined, dynamically adjusted values. In other words, the resource capacity allocation is increased or decreased at operations 320, 330 based on dynamic control. The dynamic control can monitor certain data traffic metrics, including a data pace, data load, data processing rate, quality of service, count of errors, and the like, or calculate estimations (predictions) of data traffic metrics. Based on the data traffic metrics or estimations, shared pool controller 115 can dynamically adjust, change, tune, or otherwise vary the first threshold value, the second threshold value, or both based on one or more predefined rules.

Figure 4:
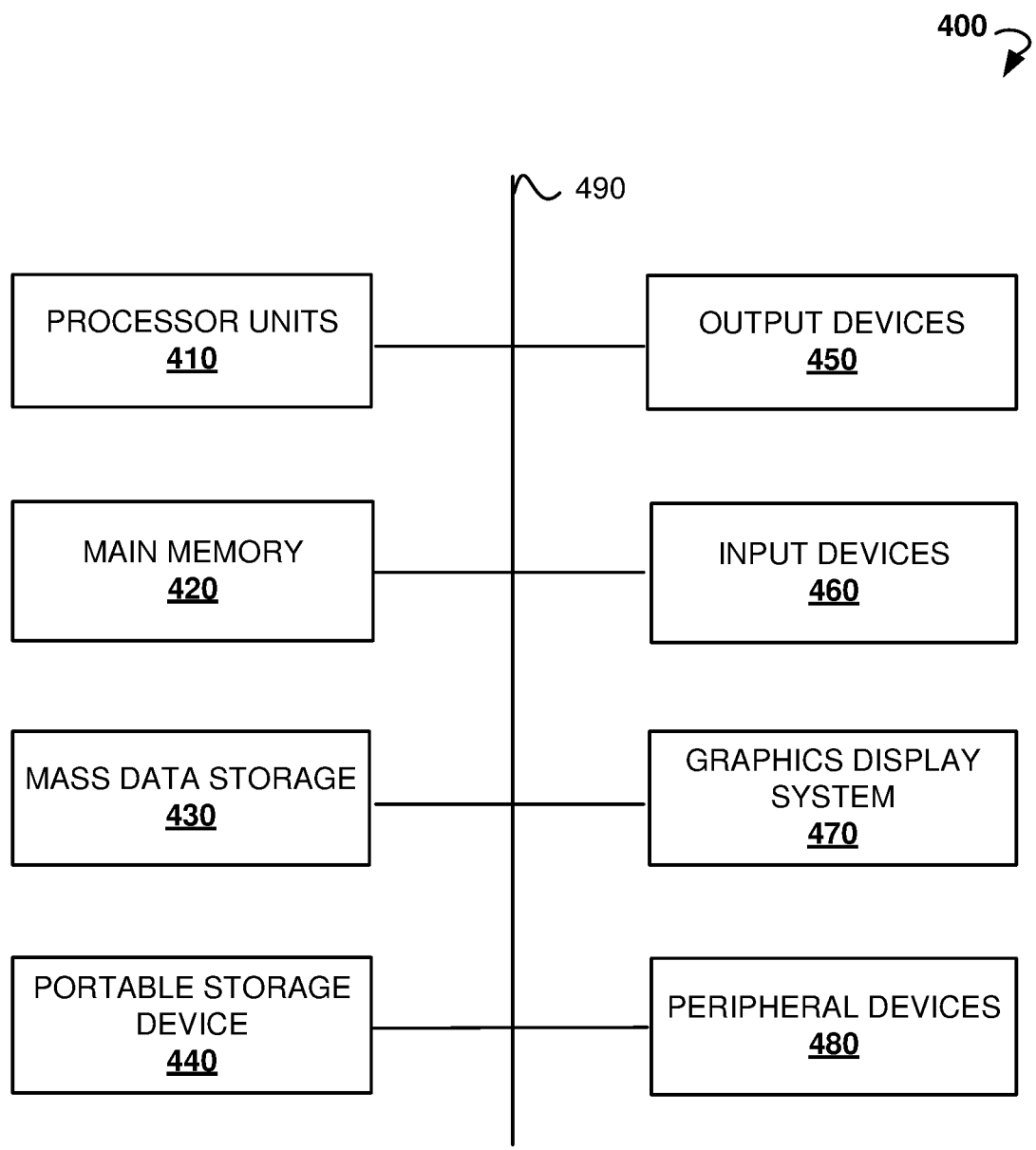
FIG. 4 is a diagrammatic representation of a computing device for a machine, within which a set of instructions for causing the machine to perform any one or more of the methodologies discussed herein can be executed.

FIG. 4 illustrates a computer system 400 that may be used to implement embodiments of the present disclosure, according to an example embodiment. Computer system 400 may serve as a computing device for a machine, within which a set of instructions for causing the machine to perform any one or more of the methodologies discussed herein can be executed. Computer system 400 can be implemented in the context of the likes of computing systems, networks, servers, or combinations thereof. For example, computer system 400 can be implemented in the context of the likes of shared pool controller 115, certain network instances 110, or end user devices. Computer system 400 includes one or more processor units 410 and main memory 420. Main memory 420 stores, in part, instructions and data for execution by processor units 410. Main memory 420 stores the executable code when in operation. Computer system 400 further includes a mass data storage 430, a portable storage device 440, output devices 450, input devices 460, a graphics display system 470, and peripheral devices 480.

The components shown in FIG. 4 are depicted as being connected via a single bus 490. The components may be connected through one or more data transport means. Processor units 410 and main memory 420 are connected via a local microprocessor bus, and mass data storage 430, peripheral devices 480, the portable storage device 440, and graphics display system 470 are connected via one or more I/O buses.

Mass data storage 430, which can be implemented with a magnetic disk drive, solid state drive, or an optical disk drive, is a non-volatile storage device for storing data and instructions for use by processor units 410. Mass data storage 430 stores the system software for implementing embodiments of the present disclosure for purposes of loading that software into main memory 420.

The portable storage device 540 operates in conjunction with a portable non-volatile storage medium, such as a compact disk, a Digital Versatile Disc (DVD), or USB storage device, to input and output data and code to and from computer system 400. The system software for implementing embodiments of the present disclosure is stored on such a portable medium and input to computer system 400 via the portable storage device 440.

Input devices 460 provide a portion of a user interface. Input devices 460 include one or more microphones; an alphanumeric keypad, such as a keyboard, for inputting alphanumeric and other information; or a pointing device, such as a mouse, a trackball, stylus, or cursor direction keys. Input devices 460 can also include a touchscreen. Additionally, computer system 400 includes output devices 450. Suitable output devices include speakers, printers, network interfaces, and monitors. Furthermore, computer system 400 can include a network interface, which is part of both input devices 460 and output devices 450, as it serves for sending and receive data over one or more data networks or communications networks.

Graphics display system 470 includes a liquid crystal display or other suitable display device. Graphics display system 470 receives textual and graphical information and processes the information for output to the display device. Peripheral devices 480 may include any type of computer support device to add additional functionality to the computer system.

The components provided in computer system 400 are those typically found in computer systems that may be suitable for use with embodiments of the present disclosure and are intended to represent a broad category of such computer components that are well known in the art. Thus, computer system 400 can be a personal computer, handheld computing system, telephone, mobile computing system, workstation, tablet, phablet, mobile phone, server, network device, minicomputer, mainframe computer, or any other computing system. The computer may also include different bus configurations, networked platforms, multi-processor platforms, and the like.

It is noteworthy that any hardware platform suitable for performing the processing described herein is suitable for use with the embodiments provided herein. Computer-readable (or processor-readable) storage media can include any non-transitory medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, computer system 400 may be implemented as a cloud-based computing environment, such as a virtual machine operating within a computing cloud. In other embodiments, computer system 400 may itself include a cloud-based computing environment, where the functionalities of computer system 400 are executed in a distributed fashion. Thus, computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for dynamic allocating a resource capacity in a cloud computing deployment have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for dynamic allocating of a resource capacity in a cloud computing deployment, the method comprising:
   receiving an allocation request from a network instance generated during a pre-boot operation of the network instance, the allocation request being based on a predicted traffic demand of the network instance, wherein the network instance includes a network device connected to a data network;
   providing an initial resource capacity allocation of the network instance by allocating initial resource capacity of a shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

monitoring a resource capacity demand of the network instance;

if the resource capacity demand exceeds a first threshold value, increasing the initial resource capacity allocation of the network instance by allocating additional resource capacity of the shared pool of network instances; and if the resource capacity demand falls below a second threshold value, decreasing the initial resource capacity allocation of the network instance by deallocating the additional resource capacity back to the shared pool of network instances.

2. The method of claim 1, wherein the monitoring of the resource capacity demand of the network instance is performed by the network instance; and
wherein the increasing or decreasing of the initial resource capacity allocation of the network instance is performed by a controller of the shared pool.

3. The method of claim 1, wherein the monitoring of the resource capacity demand of the network instance is performed by a controller of the shared pool; and
wherein the increasing or decreasing of the initial resource capacity allocation of the network instance is performed by the controller of the shared pool.

4. The method of claim 1, wherein the shared pool of network instances includes at least a first set of network instances deployed at a first site, a second set of network instances deployed at a second site, and a third set of network instances deployed at a third site.

5. The method of claim 4, wherein each of the first site, the second site, and the third site have the same or substantially same resource capacity.

6. The method of claim 1, wherein the resource capacity demand of the network instance is monitored by measuring an incoming data traffic to the network instance.

7. The method of claim 1, wherein the initial resource capacity allocation is increased or decreased based on dynamic control.

8. The method of claim 1, further comprising:
creating the shared pool of network instances by generating a plurality of tokens, wherein the tokens reside at the network instances of the shared pool.

9. The method of claim 8, wherein each of the tokens indicates an association of the network instance to the shared pool of network instances.

10. The method of claim 8, wherein the shared pool of network instances is created during a pre-boot time of the network instances.

11. A system for dynamic allocating of a resource capacity in a cloud computing deployment, the system comprising at least one processor and at least one memory storing processor-executable codes, wherein the at least one processor is configured to implement the following operations upon executing the processor-executable codes:
receiving an allocation request from a network instance generated during a pre-boot operation of the network instance, the allocation request being based on a predicted traffic demand of the network instance, wherein the network instance includes a network device connected to a data network;

providing an initial resource capacity allocation of the network instance by allocating initial resource capacity of a shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

monitoring a resource capacity demand of the network instance;

if the resource capacity demand exceeds a first threshold value, increasing the initial resource capacity allocation of the network instance by allocating additional resource capacity of the shared pool of network instances; and if the resource capacity demand falls below a second threshold value, decreasing the initial resource capacity allocation of the network instance by deallocating the additional resource capacity back to the shared pool of network instances.

12. The system of claim 11, wherein the shared pool of network instances includes at least a first set of network instances deployed at a first site, a second set of network instances deployed at a second site, and a third set of network instances deployed at a third site.

13. The system of claim 12, wherein each of the first site, the second site, and the third site have the same or substantially same resource capacity.

14. The system of claim 11, wherein the resource capacity demand of the network instance is monitored by measuring an incoming data traffic to the network instance.

15. The system of claim 11, wherein the initial resource capacity allocation is increased or decreased based on dynamic control.

16. The system of claim 11, wherein each of the network instances includes a token indicating an association of the network instance with the shared pool of network instances.

17. The system of claim 11, wherein the shared pool of network instances is created during a pre-boot time of the network instances.

18. A method for dynamic allocating of a resource capacity in a cloud computing deployment, the method comprising:
receiving an allocation request from a network instance generated during a pre-boot operation of the network instance, the allocation request being based on a predicted traffic demand of the network instance, wherein the network instance includes a network device connected to a data network;

providing initial resource capacity allocation of the network instance by allocating initial resource capacity of a shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

determining a resource capacity allocation of the network instance;

monitoring a resource capacity demand of the network instance;

if the resource capacity demand exceeds a first threshold value, increasing the resource capacity allocation of the network instance by allocating additional resource capacity of the shared pool of network instances, the shared pool of network instances including at least a first set of network instances deployed at a first site, a second set of network instances deployed at a second site, and a third set of network instances deployed at a third site, each of the first site, the second site, and the third site having substantially the same resource capacity; and if the resource capacity demand falls below a second threshold value, decreasing the resource capacity allocation of the network instance by deallocating the additional resource capacity back to the shared pool of network instances.

19. The method of claim 18, wherein the monitoring of the resource capacity demand of the network instance is performed by the network instance; and
wherein the increasing or decreasing of the resource capacity allocation of the network instance is performed by a controller of the shared pool.

20. The method of claim 18, wherein the monitoring of the resource capacity demand of the network instance is performed by a controller of the shared pool; and
wherein the increasing or decreasing of the resource capacity allocation of the network instance is performed by the controller of the shared pool.

21. The method of claim 18, wherein the resource capacity demand of the network instance is monitored by measuring an incoming data traffic to the network instance.

22. The method of claim 18, wherein the resource capacity allocation is increased or decreased based on dynamic control.

23. The method of claim 18, further comprising:
creating the shared pool of network instances by generating a plurality of tokens, wherein the tokens reside at the network instances of the shared pool.

24. The method of claim 23, wherein each of the tokens indicates an association of the network instance to the shared pool of network instances.

25. The method of claim 23, wherein the shared pool of network instances is created during a pre-boot time of the network instances.

26. A method for dynamic allocating of a resource capacity in a cloud computing deployment, the method comprising:

receiving an allocation request from a network instance generated during a pre-boot operation of the network instance, the allocation request being based on predicted traffic demand of the network instance, wherein the network instance includes a network device connected to a data network;

providing initial resource capacity allocation of the network instance by allocating initial resource capacity of a shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

determining a resource capacity allocation of the network instance;

monitoring a resource capacity demand of the network instance;

if the resource capacity demand exceeds a first threshold value, increasing the resource capacity allocation of the network instance by allocating additional resource capacity of the shared pool of network instances, the shared pool of network instances being created by generating a plurality of tokens, the tokens residing at the network instances of the shared pool, and the shared pool of network instances being created during a pre-boot time of the network instances; and if the resource capacity demand falls below a second threshold value, decreasing the resource capacity allocation of the network instance by deallocating the additional resource capacity back to the shared pool of network instances.

27. The method of claim 26, wherein the monitoring of the resource capacity demand of the network instance is performed by the network instance; and
wherein the increasing or decreasing of the resource capacity allocation of the network instance is performed by a controller of the shared pool.

28. The method of claim 26, wherein the monitoring of the resource capacity demand of the network instance is performed by a controller of the shared pool; and
wherein the increasing or decreasing of the resource capacity allocation of the network instance is performed by the controller of the shared pool.

29. The method of claim 26, wherein the shared pool of network instances includes at least a first set of network instances deployed at a first site, a second set of network instances deployed at a second site, and a third set of network instances deployed at a third site.

30. The method of claim 29, wherein each of the first site, the second site, and the third site have the same or substantially same resource capacity.

31. The method of claim 26, wherein the resource capacity demand of the network instance is monitored by measuring an incoming data traffic to the network instance.

32. The method of claim 26, wherein the resource capacity allocation is increased or decreased based on dynamic control.

33. The method of claim 26, wherein each of the tokens indicates an association of the network instance to the shared pool of network instances.

34. A system for dynamic allocating of a resource capacity in a cloud computing deployment, the system comprising at least one processor and at least one memory storing processor-executable codes, wherein the at least one processor is configured to implement the following operations upon executing the processor-executable codes:

receiving an allocation request from a network instance generated during a pre-boot operation of the network instance, the allocation request being based on predicted traffic demand of the network instance, wherein the network instance includes a network device connected to a data network;

providing initial resource capacity allocation of the network instance by allocating initial resource capacity of a shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

monitoring a resource capacity demand of the network instance;

if the resource capacity demand exceeds a first threshold value, increasing the initial resource capacity allocation of the network instance by allocating additional resource capacity of the shared pool of network instances; and if the resource capacity demand falls below a second threshold value, decreasing the initial resource capacity allocation of the network instance by deallocating the additional resource capacity back to the shared pool of network instances.

35. The system of claim 34, wherein the shared pool of network instances includes at least a first set of network instances deployed at a first site, a second set of network instances deployed at a second site, and a third set of network instances deployed at a third site.

36. The system of claim 35, wherein each of the first site, the second site, and the third site have the same or substantially same resource capacity.

37. The system of claim 34, wherein the resource capacity demand of the network instance is monitored by measuring an incoming data traffic to the network instance.

38. The system of claim 34, wherein the initial resource capacity allocation is increased or decreased based on dynamic control.

39. The system of claim 34, wherein each of the network instances includes a token indicating an association of the network instance with the shared pool of network instances.

40. The system of claim 34, wherein the shared pool of network instances is created during a pre-boot time of the network instances.

41. A system for dynamic allocating of a resource capacity in a cloud computing deployment, the system comprising at least one processor, at least one memory storing processor-executable codes, and a controller of a shared pool, wherein the controller of the shared pool is configured to:

receive an allocation request from a network instance generated during a pre-boot operation of the network instance, the allocation request being based on predicted traffic demand of the network instance, wherein the network instance includes a network device connected to a data network; and provide initial resource capacity allocation of the network instance by allocating initial resource capacity of the shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

wherein the at least one processor is configured to implement the following operations upon executing the processor-executable codes:

determining a resource capacity allocation of the network instance;

monitoring a resource capacity demand of the network instance;

if the resource capacity demand exceeds a first threshold value, increasing the resource capacity allocation of the network instance by allocating additional resource capacity of the shared pool of network instances, the shared pool of network instances including at least a first set of network instances deployed at a first site, a second set of network instances deployed at a second site, and a third set of network instances deployed at a third site, each of the first site, the second site, and the third site having substantially the same resource capacity; and if the resource capacity demand falls below a second threshold value, decreasing the resource capacity allocation of the network instance by deallocating the additional resource capacity back to the shared pool of network instances.

42. The system of claim 41, wherein the resource capacity demand of the network instance is monitored by measuring an incoming data traffic to the network instance.

43. The system of claim 41, wherein the resource capacity allocation is increased or decreased based on dynamic control.

44. The system of claim 41, wherein each of the network instances includes a token indicating an association of the network instance with the shared pool of network instances.

45. The system of claim 41, wherein the shared pool of network instances is created during a pre-boot time of the network instances.

46. A system for dynamic allocating of a resource capacity in a cloud computing deployment, the system comprising at least one processor, at least one memory storing processor-executable codes, and a controller of a shared pool, wherein the controller of the shared pool is configured to:

receive an allocation request from a network instance generated during a pre-boot operation of the network instance, the allocation request being based on predicted traffic demand of the network instance, wherein the network instance includes a network device connected to a data network; and provide initial resource capacity allocation of the network instance by allocating initial resource capacity of the shared pool of network instances, wherein the initial resource capacity is determined based on the allocation request, wherein the shared pool of network instances includes a plurality of network instances connected to the data network, the shared pool being created by providing an identifier to each of the plurality of network instances, the identifier being stored at each of the plurality of network instances and indicative of an association of each of the plurality of network instances to the shared pool;

wherein the at least one processor is configured to implement the following operations upon executing the processor-executable codes:

determining a resource capacity allocation of the network instance;

monitoring a resource capacity demand of the network instance;

if the resource capacity demand exceeds a first threshold value, increasing the resource capacity allocation of the network instance by allocating additional resource capacity of the shared pool of network instances, the shared pool of network instances being created during a pre-boot time of the network instances; and if the resource capacity demand falls below a second threshold value, decreasing the resource capacity allocation of the network instance by deallocating the additional resource capacity back to the shared pool of network instances.

47. The system of claim 46, wherein the shared pool of network instances includes at least a first set of network instances deployed at a first site, a second set of network instances deployed at a second site, and a third set of network instances deployed at a third site.

48. The system of claim 47, wherein each of the first site, the second site, and the third site have the same or substantially same resource capacity.

49. The system of claim 46, wherein the resource capacity demand of the network instance is monitored by measuring an incoming data traffic to the network instance.

50. The system of claim 46, wherein the resource capacity allocation is increased or decreased based on dynamic control.

51. The system of claim 46, wherein each of the network instances includes a token indicating an association of the network instance with the shared pool of network instances.

* * * * *